United States Patent Office 2,815,972
Patented Dec. 10, 1957

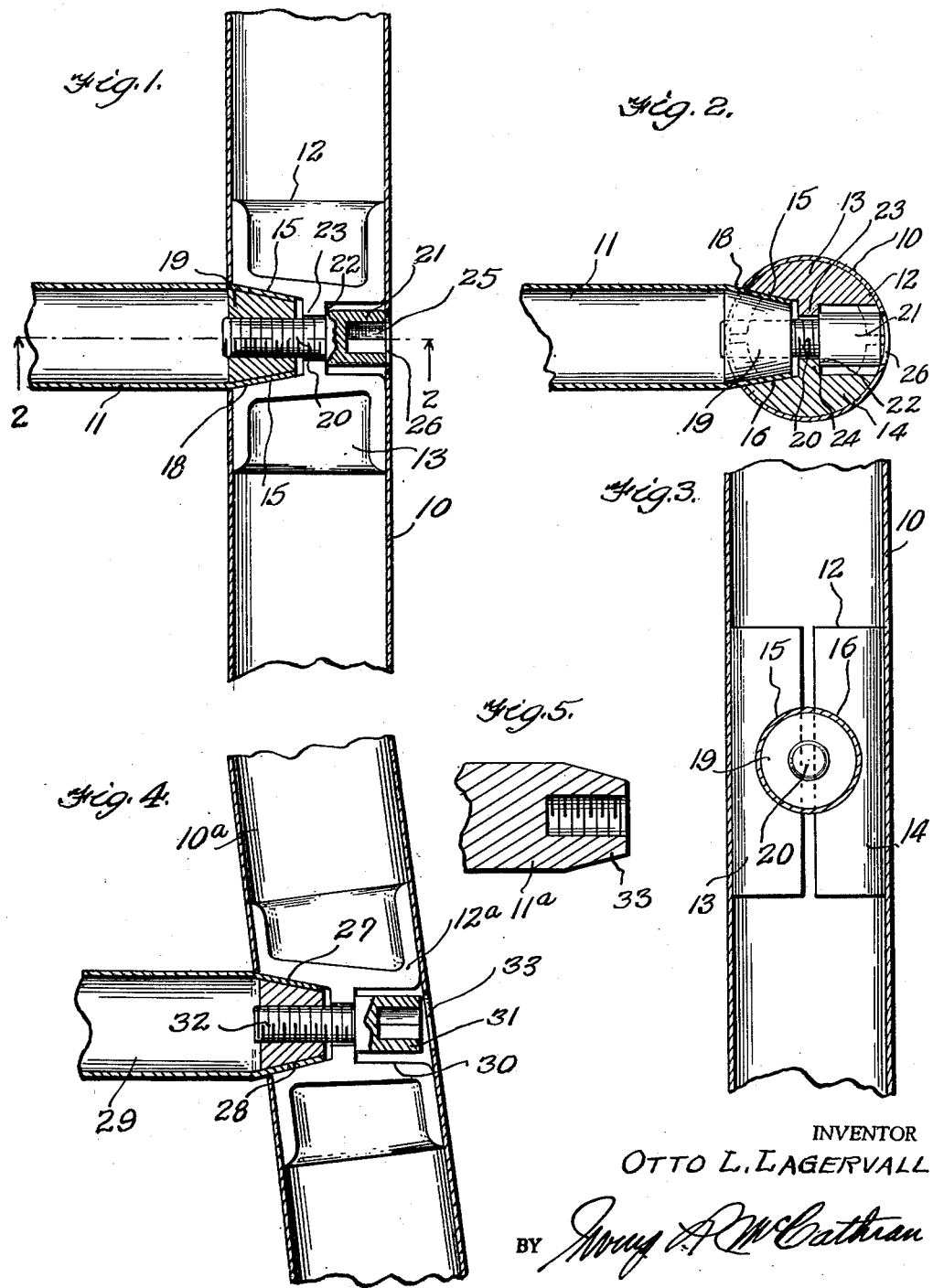

2,815,972
TUBE GRIP JOINT

Otto L. Lagervall, Yakima, Wash.

Application May 27, 1955, Serial No. 511,576

1 Claim. (Cl. 287—54)

This invention relates to a tube grip joint, and has for one of its objects the production of a simple and efficient means for firmly holding two tubes together, where one tube extends at an angle to the other tube.

A further object of the present invention is the production of a simple and efficient solid holding union or connection between two tubes to firmly anchor two angularly extending tubes together.

Other objects and advantages of the present invention will appear throughout the following specification and claim.

In the drawing:

Figure 1 is a vertical sectional view through a vertical and a horizontal tube, showing the tube grip in position;

Figure 2 is a transverse sectional view taken on line 2—2 of Figure 1;

Figure 3 is a vertical sectional view taken at right angles to Figure 1, and showing the horizontal tube in cross-section;

Figure 4 is a vertical sectional view of a modified form of the invention, showing the manner of connecting a horizontal tube to an upwardly extending tube at an oblique angle;

Figure 5 is a fragmentary longitudinal sectional view of a horizontal member in the nature of a solid rod as distinguished from the horizontal tube.

By referring to the drawing in detail, it will be seen that 10 designates a primary or vertical tube of a suitable diameter, to which is attached a companion horizontal tube 11 of a suitable diameter which in the present illustration is of a smaller diameter. A tube grip 12 which consists of two separable sections 13 and 14, is fitted within the vertical tube 10 in the manner shown in Figures 1, 2 and 3. This tube grip 12 conforms to the contour of the inner face of the wall of the tube 10 and is adapted to snugly contact the same.

The section 13 of the tube grip 12 is provided with an inwardly tapering socket 15 in its inner face. This socket 15 is semi-circular in cross-section. The section 14 of the tube grip 12 is likewise provided with a similar inwardly tapering socket 16 formed in the inner face thereof. This socket 16 is also semi-circular in cross-section. The sockets 15 and 16 are transversely aligned to define a circular tube receiving socket. The sections 13 and 14 of the tube grip when placed within the tube 10 are laterally spaced, as shown in Figure 3.

The transverse tube 11 is provided with a tapered end 18, and this tapered end 18 receives a tapering filler plug 19. The tapered end 18 snugly fits in the registering sockets 15 and 16, and the tapered end 18 is rendered rigid by means of the filler plug 19. An anchoring bolt 20 is threaded into the tapering filler plug 19, as shown in Figures 1 and 2, and is provided with a hollow head 21. The head 21 is provided with an abutment shoulder 22 which abuts the ribs 23 and 24 of the respective sections 13 and 14 of the tube grip 12. The hollow head 21 is provided with a wrench receiving socket 25 to receive a suitable wrench which may be inserted through the aperture 26 formed in the tube 10 adjacent the head 21 to tighten the bolt 20.

As the bolt 20 is tightened, the tapering plug 19 is drawn into the sockets 15 and 16, thereby forcing the tapered end 18 of the horizontal tube 11 against the walls of the sockets 15 and 16. The sections 13 and 14 of the tube grip 12 will in this way be separated or expanded against the inner face of the wall of the tube 10 to securely anchor the horizontal tube 11 in engagement with the vertical tube 10. In this way a rigid or solid holding union is provided between the tubes 10 and 11. If desired, the aperture 26 may be sealed after the parts are assembled.

As is shown in Figure 4, the upwardly extending tube 10ᵃ may extend at an oblique angle to a vertical line. The tube grip 12ᵃ which is similarly constructed relative to the tube grip 12, also is formed of two sections which fit in the tube 10ᵃ in the same manner as defined with respect to Figures 1 and 2. The socket 27 which receives the tapered end 28 of the horizontal tube 29, and the socket 30 which receives the head 31 of the bolt 32, extend at a proper angle to support the tube 29 in a horizontal position. The tube 10ᵃ is provided with an aperture 33 to facilitate the insertion of a wrench through the wall of the tube 10ᵃ for engagement with the head 31 of the bolt 32. If desired, the aperture 33 may be sealed after the parts are assembled.

As shown in Figure 5, the horizontal member 11ᵃ may be a solid rod having a tapered internally threaded end 33 for receiving an anchoring bolt similar to the bolt 20, shown in Figures 1 and 2. This solid rod may be used in place of the tube 11, is desired, within the scope of the invention.

It will be noted that the tube grip 12 and bolt all lie within the exterior portion of the primary portion of the primary tube, and the filler plug 19 lies within the tapering end of the companion tube to avoid any exterior obstruction.

It should be understood that certain detail changes in the construction and arrangement of parts may be employed without departing from the spirit of the invention, so long as such changes fall within the scope of the appended claim.

Having described the invention, what I claim as new is:

A tube grip joint of the class described comprising a primary tube, a companion tube extending at an angle to said primary tube, a separable section tube grip fitted within said primary tube, said tube grip conforming to the contour of the inner face of the wall of said primary tube to snugly contact the same, the sections of the tube grip having tapering matching sockets semi-circular in cross-section in their inner faces thereby defining a tapering circular tube receiving socket, said companion tube having a tapered end snugly fitting in said sockets of said separable section tube grip, a tapering filler plug fitted in said tapered end of said companion tube to render said tapered end rigid, an anchoring bolt threaded into said filler plug and having a hollow wrench receiving head, said head having an abutment shoulder abutting said separable sections of said tube grip, said primary tube having a wrench receiving aperture in alignment with said hollow wrench receiving head to facilitate the receiving of a wrench inwardly of the exterior of the primary tube, the tube grip and anchoring bolt both lying within the interior portion of said primary tube and the filler plug lying within the tapering end of said companion tube.

References Cited in the file of this patent

UNITED STATES PATENTS

| | | |
|---|---|---|
| 1,322,801 | Lewis | Nov. 25, 1919 |
| 2,018,250 | Cohan | Oct. 22, 1935 |
| 2,179,089 | Hauf | Nov. 7, 1939 |
| 2,238,561 | Goodyear | Apr. 15, 1941 |

FOREIGN PATENTS

| | | |
|---|---|---|
| 1,061,428 | France | Nov. 25, 1953 |